(12) United States Patent
Sikora et al.

(10) Patent No.: US 12,461,025 B2
(45) Date of Patent: Nov. 4, 2025

(54) METHOD AND DEVICE FOR DETECTING DEFECTS OF A STRAND-LIKE PRODUCT

(71) Applicant: Sikora AG, Bremen (DE)

(72) Inventors: Harald Sikora, Bremen (DE); Armin Holle, Achim (DE); Kolja Tobias Schuh, Bremen (DE)

(73) Assignee: SIKORA AG, Bremen (DE)

( * ) Notice: Subject to any disclaimer, the term of this patent is extended or adjusted under 35 U.S.C. 154(b) by 144 days.

(21) Appl. No.: 18/270,648

(22) PCT Filed: Dec. 20, 2021

(86) PCT No.: PCT/EP2021/086789
§ 371 (c)(1),
(2) Date: Jun. 30, 2023

(87) PCT Pub. No.: WO2022/148642
PCT Pub. Date: Jul. 14, 2022

(65) Prior Publication Data
US 2024/0068939 A1 Feb. 29, 2024

(30) Foreign Application Priority Data
Jan. 5, 2021 (DE) .................. 10 2021 100 051.3

(51) Int. Cl.
G01N 21/35 (2014.01)
G01N 21/3581 (2014.01)
(Continued)

(52) U.S. Cl.
CPC ..... *G01N 21/3581* (2013.01); *G01N 21/8914* (2013.01); *G01N 21/892* (2013.01); *G01N 21/954* (2013.01); *G01N 2021/8918* (2013.01)

(58) Field of Classification Search
CPC ........... G01N 21/3581; G01N 21/3586; G01N 21/3563; G01N 2291/014;
(Continued)

(56) References Cited

U.S. PATENT DOCUMENTS

| 10,514,336 B2 * | 12/2019 | Thiel | ............... G01B 11/24 |
| 2018/0112973 A1 * | 4/2018 | Sikora | ............... G01J 5/10 |
| 2019/0107485 A1 | 4/2019 | Thiel | |

FOREIGN PATENT DOCUMENTS

| CN | 207867053 U * | 9/2018 | |
| DE | 102016105599 A1 * | 10/2017 | ............. G01B 11/06 |

(Continued)

OTHER PUBLICATIONS

European Patent Office (ISA/EP). International Search Report and Written Opinion of the ISA/EP from priority PCT application No. PCT/EP2021/086789, with English translation of ISR only, mailed Mar. 17, 2022 (total 10 pages).
(Continued)

*Primary Examiner* — Michael P Stafira
(74) *Attorney, Agent, or Firm* — Barclay Damon LLP

(57) ABSTRACT

A method is provided for detecting a defect of a strand-like product conveyed in a conveying direction at a conveying speed of more than 50 m/min. The method includes determining a frequency of a lateral movement of the strand-like product. The lateral movement occurs in a direction that is transverse to the conveying direction. Terahertz radiation is emitted at a wavelength by at least one transmitter onto the strand-like product conveyed in the conveying direction. The terahertz radiation is reflected by the strand-like product and received by at least one receiver. A temporary change in the terahertz radiation received by the at least one receiver is detected. A defect in the strand-like product is inferred when the temporary change in the terahertz radiation
(Continued)

received by the at least one receiver is higher than the frequency of the lateral movement of the strand-like product.

20 Claims, 2 Drawing Sheets

(51) Int. Cl.
  *G01N 21/89* (2006.01)
  *G01N 21/892* (2006.01)
  *G01N 21/954* (2006.01)

(58) Field of Classification Search
  CPC .......... G01N 2291/2695; G01N 29/12; G01N 29/2418; G01N 21/85; G01N 33/442; G01N 21/41; G01N 21/8806; G01N 3/32; G01N 3/56; G01N 2021/1704; G01N 21/1702; G01N 21/8914; G01N 2201/06113; G01N 23/04; G01N 23/044; G01N 33/445; G01N 2021/8472; G01N 21/35; G01N 21/9505; G01N 2201/103; G01N 2021/1714; G01N 2021/1738; G01N 2021/1757; G01N 2021/1765; G01N 2021/1787; G01N 2021/258; G01N 2021/8444; G01N 21/171; G01N 21/3504; G01N 21/553; G01N 21/554; G01N 21/636; G01N 21/645; G01N 21/6458; G01N 21/65; G01N 21/88; G01N 21/8851; G01N 21/954; G01N 2201/0221; G01N 2201/0636; G01N 2201/10; G01N 2201/12; G01N 23/22; G01N 23/2251; G01N 27/4145; G01N 27/4146; G01N 2021/1725; G01N 2021/3572; G01N 2021/8411; G01N 2021/8438; G01N 2021/8917; G01N 2021/8918; G01N 2021/8925; G01N 21/01; G01N 21/1717; G01N 21/21; G01N 21/23; G01N 21/27; G01N 21/274; G01N 21/33; G01N 21/45; G01N 21/49; G01N 21/59; G01N 21/8422; G01N 21/892; G01N 21/93; G01N 21/9501; G01N 21/9503; G01N 21/9508; G01N 21/9515; G01N 21/952; G01N 22/00; G01N 2201/06; G01N 33/15; G01N 33/32; G01N 33/346; G01N 33/497; G01N 9/24; G01N 9/36
  See application file for complete search history.

(56) References Cited

FOREIGN PATENT DOCUMENTS

| | | | | |
|---|---|---|---|---|
| DE | 102017125740 A1 | * | 5/2019 | ........... G01B 11/026 |
| DE | 102017125753 A1 | | 5/2019 | |
| DE | 102017125740 B4 | * | 5/2021 | ........... G01B 11/026 |
| EP | 2752287 A1 | * | 7/2014 | ............. B29C 48/06 |
| EP | 2982932 A1 | * | 2/2016 | ............. G01B 11/06 |
| EP | 3480553 A1 | * | 5/2019 | ........... G01B 11/028 |
| JP | 2005043230 A | | 2/2005 | |
| JP | 2016109687 A | | 6/2016 | |
| WO | 2010007693 A1 | | 1/2010 | |
| WO | WO-2016139155 A1 | * | 9/2016 | ......... G01N 21/3581 |
| WO | WO-2017178009 A1 | * | 10/2017 | ............. G01B 11/06 |
| WO | WO-2017215712 A1 | * | 12/2017 | ............. G01B 11/06 |
| WO | 2018132258 A1 | | 7/2018 | |
| WO | WO-2019086081 A1 | * | 5/2019 | ........... G01B 11/026 |
| WO | WO-2021102558 A1 | * | 6/2021 | ........... H05K 13/081 |

OTHER PUBLICATIONS

European Patent Office; International Preliminary Report on Patentability; International Application No. PCT/EP2021/086789; Dated: Nov. 15, 2022; 5 pages.

JP 2023-539921, filed Aug. 3, 2021; Notification of Reasons for Refusal; Drafting Date May 29, 2024 (6 pages).

JP 2023-539921, filed Aug. 3, 2021; English translation of Notification of Reasons for Refusal; Drafting Date May 29, 2024 (6 pages).

* cited by examiner

METHOD AND DEVICE FOR DETECTING DEFECTS OF A STRAND-LIKE PRODUCT

CROSS REFERENCE TO RELATED APPLICATIONS

This application is a national stage application pursuant to 35 U.S.C. § 387 of international application No. PCT/EP2021/086789, filed Dec. 20, 2021, which claims priority to, and the benefit of, German Patent Application No. 10 2021 100 051.3, filed on Jan. 5, 2021. The entire contents of said applications are hereby incorporated by reference.

TECHNOLOGICAL FIELD

The following disclosure is directed to a method for detecting defects of a strand-like product which is conveyed in a conveying direction. The disclosure is further directed to a device for detecting defects of a strand-like product which is conveyed in a conveying direction.

BACKGROUND

Thin plastics pipes, so-called microducts, into which data cables, for example consisting of optical fiber, are pushed at a later point in time, can be produced in extrusion devices. Plastics pipes of this kind have a small outer and inner diameter. Thin tubes, for example medical tubes such as infusion lines for medical applications, can also be produced in plants of this kind. In the case of medical tubes of this kind, these may be single- or multilumen tubes. During the extrusion process, uncontrolled and irregular leakage of residues of extruded material from the extruder can occur. Extrusion residue of this kind, which falls off for example in a daily or multi-day rhythm, can adhere to the inside of the extruded pipe on the pipe inner wall and at least partially reduce the free cross-sectional area of the pipe. Residue of this kind can also remain in motion inside the pipe and be carried along if, for example, a liquid is guided through during later use and can lead to obstruction of the pipe or leak out in an uncontrolled manner. Both scenarios must absolutely be avoided in medical applications. Residue of this kind leads to corresponding waste.

Due to the generally high conveying speed of, in particular thin, extruded strands, online detection of defects, for example extrusion residue remaining inside the pipe, has so far not been possible to a satisfactory extent. In the prior art, two methods for detecting defects are currently established. According to a first method, a mandrel of approximately 80% of the inner diameter of the pipe is held magnetically in the pipe interior. If said mandrel is then carried away out of its held position, in particular by means of extrusion residue located inside the conveyed pipe, a corresponding error signal is output. According to a second method, after extrusion has been completed, a ball of approx. 80% of the inner diameter of the pipe is blown through an entire roll of extruded pipe by means of compressed air. If there is no extrusion residue in the interior, said ball exits after traveling through the entire pipe. However, if the ball does not exit, this indicates the presence of extrusion residue. For example, a metal wire is often passed through medical tubes within the scope of final production in order to ensure proper passage.

The known detection methods are complex and do not allow for contactless detection. Furthermore, at least the latter methods only allow for detection after completion of the production process, which leads to a correspondingly large amount of waste. Accurate localization of a defect is difficult or impossible. Moreover, the known detection methods are only suitable for tubular products.

BRIEF SUMMARY

Proceeding from the explained prior art, the object of the invention is therefore to provide a method and a device of the type mentioned at the outset by means of which defects of a conveyed strand-like product, in particular extrusion residue that narrows the cross-section inside an extruded strand-like product, can be detected reliably and precisely online and contactlessly with little effort.

In an embodiment, terahertz radiation is emitted by at least one transmitter onto the strand-like product conveyed in the conveying direction and terahertz radiation reflected by the strand-like product is received by at least one receiver, and in that a defect of the strand-like product is inferred from a temporary change in the terahertz radiation signal received by the at least one receiver.

In an embodiment, a device for detecting defects of a strand-like product is disclosed and comprises at least one transmitter for emitting terahertz radiation onto the strand-like product conveyed in the conveying direction and at least one receiver for receiving terahertz radiation reflected by the strand-like product. In an embodiment, the device further comprises an evaluation apparatus which is configured to infer a defect of the strand-like product from a temporary change in the terahertz radiation signal received by the at least one receiver.

The strand-like product is, in particular, a uniform product. Without any defects, the strand-like product in particular has a largely constant profile with regard to geometry and material. It may, in particular, be an elongate product. The strand-like product may be a pipe. The strand-like product may have a small outer and thus small inner diameter. The strand-like product may be a product which is extruded in an extrusion device. The conveying direction in which the strand-like product is conveyed may in particular extend along the longitudinal axis of the strand-like product. During the detection measurement according to the invention, the strand-like product may be conveyed at a high conveying speed. The strand-like product may, for example, comprise of plastics material, glass, or paper. The strand-like product may be a thin pipe, a so-called microduct, into which a data cable, for example consisting of an optical fiber material, is subsequently pushed. The strand-like product may also contain conductive strand-like components, as is the case, for example, in an electrical cable. Furthermore, it may, for example, be a thin tube, for example for later medical use, for example as an infusion line. In the case of medical tubes of this kind, these may be single- or multilumen tubes. Furthermore, the strand-like product may also be a profile, for example a plastics profile. Plastics profiles are often very complex and there is practically no suitable option for measuring the dimensions online during production. The invention is suitable even for products of this kind, in that defects occurring in the profile, for example extrusion residue, can be identified.

The measurement of geometric parameters, for example the diameter and/or wall thickness of a strand being conveyed in its longitudinal direction, for example a plastics pipe of a large diameter being conveyed comparatively slowly, by means of terahertz radiation is known, for example, from WO 2016/139155 A1. This invention is based on the finding that, even in the case of strand-like products of a very small diameter being conveyed very quickly, defects such as extrusion residue located inside a pipe can be reliably detected by means of terahertz radiation based on a suitable evaluation of the received terahertz radiation signals. For this purpose, according to the invention, terahertz radiation is emitted by at least one transmitter onto the strand-like product conveyed in the conveying direction and terahertz radiation reflected by the strand-like product is received by at least one receiver. The strand-like product may be at least partially transparent, in particular fully transparent, to the emitted terahertz radiation. At least some of the terahertz radiation can therefore radiate through the product and is reflected accordingly on outer and inner boundary surfaces of the strand-like product. In this way, it is possible to detect defects, for example extrusion residue, located in particular inside the strand-like product. However, the strand-like product may also comprise a material that is not transparent to the emitted terahertz radiation, for example metal. In this case, by nature, only defects on the outside of the product can be detected.

The terahertz radiation emitted by the at least one transmitter impinges on the strand-like product and is reflected on outer and, in the event of sufficient transparency, on inner boundary surfaces of the strand-like product. The reflected terahertz radiation arrives at the at least one receiver, which receives the reflected terahertz radiation as a terahertz radiation signal. The at least one receiver records a temporal progression of the received terahertz radiation. The strand-like product is moved in the conveying direction through the measurement structure during the measurement according to the invention. In the best case scenario, the strand-like product moves exclusively in the conveying direction, for example along its longitudinal axis. In this case, the terahertz radiation signal received by the at least one receiver is substantially constant, provided that no defects are present. The occurrence of a defect, for example extrusion residue located inside the strand-like product, is then evidenced particularly clearly in the temporal progression of the terahertz radiation signals or rather the variation thereof with time recorded by means of the at least one receiver.

According to an embodiment, a defect can also be detected from the terahertz radiation recorded by means of the at least one receiver if the received terahertz radiation signal is not constant without a defect. In practice, in particular strand-like products of a small diameter conveyed quickly also move laterally, in particular transversely to the conveying direction, at the same time when being conveyed in the conveying direction. This lateral movement may, in particular, be a lateral oscillation. The lateral movement may, for example, be a periodic movement. The at least one receiver then, even without the presence of a defect, receives an amplitude-modulated and phase-modulated terahertz radiation signal, which has so far precluded online detection of defects in the prior art. For example, the at least one receiver receives a periodic radiation signal without the presence of a defect. The invention is based on the finding that, even in such a case, a defect causes a characteristic change in the received terahertz radiation signals. For example, a lateral oscillation of a strand-like product conveyed in the conveying direction generally has a low oscillation frequency of less than 50 Hz, in particular less than 10 Hz, for example approximately 1 Hz. Furthermore, the strand-like product generally moves much more quickly in the conveying direction than in the lateral direction perpendicular to the conveying direction. The (maximum) movement speed of the strand-like product or rather the movement frequency of the strand-like product in the conveying direction may, for example, be at least ten times higher than the (maximum) movement speed or rather the movement frequency of the strand-like product transversely to the conveying direction. The inventors of the present application have found that, in the case of strand-like products of a small diameter conveyed quickly in the conveying direction, defects such as extrusion residue remaining in the interior appear as a temporary, in particular short-term or transient or rapid or high-frequency change in the received terahertz radiation signal. This applies in spite of a potentially present lateral movement of the strand-like product, in particular since the strand-like product has a largely constant profile with regard to geometry and material in the defect-free state.

Defects, due to their geometry and, if applicable, also their material deviation from the material of the strand-like product, generate an anomaly which leads to a corresponding change in the reflection behavior of the strand-like product. For example, a generally irregularly shaped defect, for example extrusion residue remaining inside the product, can cause reflection of the terahertz radiation that is diffuse or, alternatively, irregular compared to the inner and outer boundary surfaces of the product without a defect. This leads to a corresponding change in the radiation signal received by the at least one receiver. Since the strand-like product is generally conveyed quickly in the conveying direction, in particular compared to a lateral movement, the changed reflection behavior caused by the defect is discernible, and thus evaluable, in the temporal progression of the reflected terahertz radiation signals recorded according to the invention as a rapid, temporary change, in particular a more rapid or rather higher-frequency change than any lateral change.

The invention thus makes it possible in a simple and reliable manner to examine strand-like products conveyed in a conveying direction for defects contactlessly, online, and from the outside. Waste can be minimized. The detection according to the invention can take place in real time. Further measures can be taken on the basis of a detected defect. For example, a warning signal can be output and/or a detected defect can be displayed, in particular in real time, and/or production parameters of the extrusion device can be influenced, even stopping the extrusion device.

In contrast to other potentially conceivable measuring methods for contactlessly detecting defects, for example the use of visible light or, alternatively, laser light, the measurement according to the invention with terahertz radiation has the advantage that terahertz radiation is largely insensitive to disturbances of the like that can occur, for example, in a challenging measuring environment such as an extrusion plant. For example, in extrusion plants of this kind, as is known, the extruded product is cooled, for example by spraying a coolant such as water onto the surface of the product. In the process, considerable amounts of steam are produced, which interfere with the optical measuring methods. The use of, for example, X-ray radiation for detecting defects, which would potentially also be conceivable, results on the one hand in considerably higher costs and, on the other hand, in stringent safety requirements and corresponding effort.

In the case of the evaluation according to the disclosed invention, the terahertz transmission signals emitted by the at least one transmitter can be mixed with the terahertz reception signals received by the at least one receiver. Subsequently, band-pass filtering can take place, for example low-pass filtering. The signal $$S_j = I_j + iQ_j = s_j * \exp\left(i\frac{2d_j}{L}\right)$$

produced by the reflection of the terahertz radiation in principle results from the wavelength L of the terahertz radiation, the distance d between the at least one transmitter and/or the at least one receiver and the boundary surface causing the reflection, and the strength of the reflection s, wherein it is assumed in the above formula that the transmitter and receiver are in the same location, in particular in the form of a transceiver. The received total signal can be understood as a sum of all reflections: $S=\sum_j S_j$. Accordingly, a change in the parameters, for example the distance d, leads to a corresponding change in the received reflection signal.

The at least one transmitter and the at least one receiver may be arranged substantially at the same location. They may be integrated in a transceiver, for example. The at least one transmitter may emit mono-frequency terahertz radiation. The frequency of the terahertz radiation may, for example, lie in a frequency range of 10 GHz to 3 THz. It may be so-called millimeter waves. As already explained, reliable measurement results can be achieved with terahertz radiation, in particular in challenging process environments in which optical systems such as laser systems have difficulties. The at least one receiver and/or a corresponding transceiver preferably have an I channel and a Q channel. Therefore, quadrature amplitude modulation, which is known to a person skilled in the art, is fundamentally possible. The amplitude modulation of two carriers in quadrature can be understood as amplitude and phase modulation of a single carrier. The two baseband signals are referred to as the I channel for the in-phase component and the Q channel for the quadrature component.

According to an embodiment, a threshold which, when exceeded, indicates a defect can be specified by means of an evaluation apparatus of the device according to the invention for an identified temporary change in the terahertz radiation signal received by the at least one receiver. For example, when a defect is detected, a corresponding signal can be output, for example an alarm, or an error counter, or other measures can be implemented, as already explained.

As already explained as well, the strand-like product may be a pipe extruded in an extrusion device. The defects detected according to the invention may, as explained, be extrusion residue inside the pipe. The device according to the invention may also comprise the extrusion device.

The strand-like product can be conveyed at a conveying speed of more than 50 m/min, preferably more than 75 m/min, in the conveying direction. Furthermore, the strand-like product may have an outer diameter of less than 10 mm, preferably less than 5 mm. If the strand-like product is a pipe, the pipe may accordingly have an inner diameter of less than 10 mm, preferably less than 5 mm.

According to another embodiment, structures or wall thicknesses (to be detected) of the strand-like product may be smaller than the wavelength of the terahertz radiation used. By evaluating a change in the received radiation signals, the invention does not rely on resolving structures or, for example, wall thicknesses. In conventional measuring devices, FMCW radiation is used. This requires, for example, a correspondingly large bandwidth in order to measure wall thicknesses of a pipe. As a result, only the smallest wall thicknesses of the order of magnitude of the wavelength can generally be measured. By means of the method according to the invention, there is no need for a large bandwidth and smaller structures or rather wall thicknesses can be measured, in particular of less than the wavelengths of the terahertz radiation.

According to another embodiment, it can be provided that the strand-like product also performs a lateral movement transversely to the conveying direction when being conveyed in the conveying direction, and that a defect of the strand-like product is only inferred from the temporary change in the terahertz radiation signal received by the receiver if a frequency of the temporary change is higher than a frequency of the lateral movement of the strand-like product. A lateral change in the position of the product caused by the lateral movement leads to changes in the distance between the at least one transmitter and/or receiver and the strand-like product or rather the boundary surfaces reflecting the terahertz radiation. These changes in distance cause a phase change of the received terahertz radiation signal and additionally a weaker change in the signal strength. As already explained, such a change in the position of the product typically takes place predominantly in the low-frequency range of less than 50 Hz, in particular less than 10 Hz, for example less than 2 Hz. A defect in the strand-like product also leads to a change in the signal. For example, a foreign body such as extrusion residue inside the product leads to changed reflection behavior, for example additional reflections, and/or a local change in the boundary surface geometry, to a change in the phase and/or reflection strength of the terahertz radiation signal. Changes of this kind have significant higher-frequency components of typically more than 10 Hz, in particular more than 50 Hz, and less than 1 kHz. The frequency values may vary depending on the conveying speed. This makes it possible to reliably discriminate defects from lateral changes in the position of the product due to a lateral movement. Even lateral oscillations of the product in the frequency range of defects are fundamentally unproblematic, provided that they are sufficiently small (amplitude×frequency) in order to be distinguishable from defects. In the case of stronger oscillations, these must be identified as such in order to be able to filter them out. However, this may impair the measuring sensitivity and make evaluation more complicated. The aim should therefore be to prevent strong oscillations of the strand-like product in the above-described higher frequency range. It is possible, for example, that a defect of the strand-like product is only inferred if a frequency of the temporary change is at least 5 times as high, preferably at least 10 times as high, as a frequency of the lateral movement of the strand-like product. In order to prevent problems during detection of defects due to a lateral movement, according to the invention, means can be provided which reduce an oscillation frequency of the strand-like product transversely to the conveying direction, in particular in a sufficient manner such that any defects are reliably detected. Means of this kind may, for example, comprise corresponding guide means for the strand-like product when same is being conveyed in the conveying direction.

According to another particularly practical embodiment, the first derivative of the terahertz radiation signal received by the at least one receiver can be formed. Then, a defect can be inferred if the simply derived terahertz radiation signal exceeds a defined threshold value. By means of the derivative, in particular temporary changes in the received terahertz radiation signal can be determined by way of evaluation in a particularly reliable and simple manner. It was explained at the outset that the total signal received by the at least one receiver can be understood as the sum of all individual reflections: $S=\Sigma_j S_j$. Here, a distinction can fundamentally be made between reflections from the product $S^P$ and reflections from boundary surfaces in the environment of the product $S^U$. Since the environment does not change during the measurement, the following equation applies:

$$\frac{d}{dt}S = \frac{d}{dt}S^P.$$

The derivative of the received terahertz radiation signal is thus only caused by changes in the boundary surfaces of the strand-like product. If a defect-free product moves through the measurement structure according to the invention without any lateral movement, the reflections do not change and the derivative is 0. However, if there is a, for example periodic, lateral oscillation of the strand-like product at a low frequency, this results in an accordingly regular derivative signal. In contrast, a defect leads to a temporary and comparatively rapid change in the derivation signal and can therefore be metrologically identified in a reliable manner. The extent of a defect is essentially correlated with the strength of the derivative of the signal S. This can accordingly be used to define a threshold value from which a change in the derived terahertz radiation signal is defined as a significant defect and is detected and/or displayed. The derived terahertz radiation signals can also be processed further in order to reduce the influence of disturbances and to lower the detection threshold. For example, a reception filter is conceivable and useful for minimizing noise in the derived signal.

According to another embodiment, the n-th derivative of the terahertz radiation signal received by the at least one receiver can be formed, with n>=2, and a defect can be inferred if the n-fold derived terahertz radiation signal exceeds a defined threshold value. The threshold values for the first and the n-th derivative may be different threshold values. The formation, for example, of the second derivative also allows for examination of rapid changes in the received terahertz radiation signal. In particular, changes of this kind can be defined more precisely. For example, the direction of a change can be examined, from which further information relating to the defect can be determined. Other functions may also be suitable for evaluating rapid changes in the received terahertz radiation signal.

According to another embodiment, the threshold value may be defined depending on the conveying speed of the strand-like product in the conveying direction. The derivative of the received terahertz radiation signal is essentially proportional to the speed of the product. If the conveying speed of the product is known, this can accordingly be compensated for when the threshold value is defined.

The terahertz radiation signal received by the at least one receiver can be filtered by means of a band-pass filter. The band-pass filter may, for example, be a band-pass filter for filtering out low-frequency signal components caused by a lateral movement of the strand-like product and not by a defect. This further simplifies evaluation.

According to another embodiment, the at least one transmitter can emit a terahertz signal with a bandwidth that is less than a frequency that corresponds to the spatial resolvability of the diameter of the strand-like product. The at least one receiver may accordingly have a reception bandwidth of less than a frequency that corresponds to the spatial resolvability of the diameter of the strand-like product. In the prior art, a bandwidth of speed of light/(2*refractive index*feature size) is applied for the spatial resolvability of structures to be detected. For example, in the case of a feature size to be resolved of 1 mm and a typical refractive index of 1.5, a bandwidth of 100 GHz is required. However, terahertz transmitters and receivers having bandwidths of this kind are expensive and complex and, in particular, terahertz transmitters of this kind are subject to special approval procedures. However, according to the invention, it was found that the method according to the invention dispenses with the need for spatial resolvability and thus for a large bandwidth as in the prior art, and instead it is possible to work with a smaller bandwidth than the frequency that would be required for the spatial resolvability, in particular, of the diameter of the strand-like product. As a result, according to the invention, more simple and more cost-effective transmitters and receivers can be used.

According to another related embodiment, the at least one transmitter can emit a terahertz signal with a bandwidth of less than 5% of the average frequency of the terahertz signal, preferably less than 3% of the average frequency of the terahertz signal, more preferably less than 2% of the average frequency of the terahertz signal. As a result, conventional ISM (Industrial, Scientific and Medical) bands can be used, which makes it possible to avoid special approval procedures. For example, the bandwidth is no more than 1% of the average frequency. For example, the ISM band of 122 to 123 GHz can be used.

According to another embodiment, the at least one transmitter can emit a terahertz continuous wave signal at a frequency with a substantially constant amplitude. This produces particularly good evaluability. The at least one transmitter of the device according to the invention may accordingly be a transmitter for emitting a terahertz continuous wave signal at a frequency with a substantially constant amplitude.

According to another embodiment, it can be provided that terahertz radiation is emitted by multiple transmitters from various directions onto the strand-like product conveyed in the conveying direction, and that the terahertz radiation emitted by the multiple transmitters and reflected by the strand-like product is received by multiple receivers. The orientation of boundary surfaces reflecting the terahertz radiation is decisive for the strength of the reflection. Boundary surfaces of defects that are not oriented favorably can therefore lead to a much smaller change in the temporal progression of the received terahertz radiation signal than identical defects that are oriented differently. In order to counteract such an undesired dependence on orientation, in the above-mentioned embodiment multiple transmitters and multiple receivers are provided which, from different directions, for example distributed over the circumference of the strand-like product, emit terahertz radiation onto the strand-like product and receive terahertz radiation reflected by the product, respectively. If transmitters and receivers are integrated as transceivers, multiple transceivers can accordingly be provided, for example distributed over the circumference of the strand-like product.

The multiple transmitters can emit terahertz radiation of different frequencies. The multiple transmitters of the device according to the invention may accordingly be configured to emit terahertz radiation of different frequencies. In the presence of multiple transmitters, each transmitter preferably emits mono-frequency terahertz radiation, for example a terahertz continuous wave signal at a frequency with a substantially constant amplitude. In the above-mentioned embodiment, the frequencies of the terahertz radiation emitted by different transmitters differ from one another. As a result, the different signals emitted by the different transmitters and received by the receivers can be distinguished from one another for the evaluation. For example, by using suitable frequency filters, it can be ensured that each receiver only receives the terahertz radiation emitted by a particular transmitter.

According to another embodiment, it is also possible for there to be a defined differential frequency in each case between the frequencies of the terahertz radiation emitted by the multiple transmitters, and for the terahertz radiation emitted by the multiple transmitters to be received in each case by all receivers, wherein the terahertz radiation signals received by the receivers are evaluated by means of demodulation of the respective differential frequencies. By using synchronized transmitters or, alternatively, transceivers with a fixed differential frequency, no filtering needs to take place such that a particular transmitter only receives terahertz radiation of a particular transmitter. Instead, the signals modulated with the differential frequency of the transmission frequencies of the transmitters involved are accordingly demodulated by the receivers. As a result, the sensitivity of the measurement according to the invention is further increased and a dependence on orientation is further counteracted.

According to another embodiment, the received radiation signals, if applicable after mathematical processing, for example a first or second derivative, can be added up, in particular the squares of the received radiation signals can be added up before a defect of the strand-like product is inferred. This produces a particularly simple method of evaluation. Moreover, the error signals of all transmitters and/or receivers are reliably evaluated. For example, adding up the absolute-value squares of all derived radiation signals can take place as a particularly simple possibility for signal fusion. This is also possible if multiple transmitters and/or receivers and/or transceivers are used without a Q channel.

According to another embodiment, the terahertz radiation emitted by the at least one transmitter can be focused and/or screened off such that the extent of the region of the strand-like product irradiated by the terahertz radiation in the conveying direction of the strand-like product is smaller than transversely to the conveying direction. The measuring spot is thus reduced in size, when viewed in the conveying direction, relative to the extent of the measuring spot transversely to the conveying direction. As a result, the demarcation and identification of defects can be improved further. For this purpose, the device according to the invention may comprise a corresponding focusing apparatus and/or screen apparatus.

According to another embodiment, the at least one transmitter and/or the at least one receiver may be oriented with respect to the strand-like product in such a way that a main beam direction of the terahertz radiation extends obliquely to the conveying direction of the strand-like product. The main beam direction may extend obliquely counter to the conveying direction or in the conveying direction of the strand-like product. For example, the main beam direction may extend at an angle of less than 80°, preferably no more than 70° to the conveying direction. An inclined position of the transmitter and/or receiver, in particular of a transceiver, makes it possible to change the signal signatures of defects. In particular, the frequency of the changes in the signal increases as a result, such that said signal changes can be distinguished better from vibration frequencies of the conveyed product. For example, due to the change in the distance between the defect and the transmitter and/or receiver due to the conveying speed v, a change in the signal results with approximately the frequency f=2*v/lambda*cos (alpha), wherein lambda is the wavelength of the terahertz signal and alpha describes the angle between the conveying direction and connecting line between the defect and the transmitter and/or receiver. Since the transmitter and receiver transmits and receives, respectively, in a directed manner, the defect is only measured over a limited angular range depending on the orientation. Accordingly, a direct orientation onto the product (alpha equals approximately 90° and cos(alpha) is accordingly close to 0) leads to much lower frequencies than an inclined position. For example, in the case of a conveying speed of the product of 60 m/min, a wavelength of 2.5 mm (corresponds to 120 GHz), and an angle of alpha=70°, frequencies of roughly 270 Hz are to be expected. From experience, this constitutes a significant gap with respect to vibration frequencies of the product, as a result of which a clear distinction can be made between vibrations and defects, even if the vibration frequencies are within a range in which the error signature would also lie in the case of a direct orientation. On account of a more pronounced inclined position, the frequency can be increased further if necessary in order to also be able to deal with vibrations of an even higher frequency if necessary.

The device according to the invention, in particular the at least one transmitter and/or the at least one receiver and/or the evaluation apparatus, may be designed to carry out the method according to the invention. Accordingly, the method according to the invention can be carried out by the device according to the invention.

DESCRIPTION OF THE DRAWINGS

Exemplary embodiments of the invention are explained below in greater detail using schematic drawings, in which.

The same reference signs refer to the same objects in the figures unless indicated otherwise.

DETAILED DESCRIPTION

Figure 1:
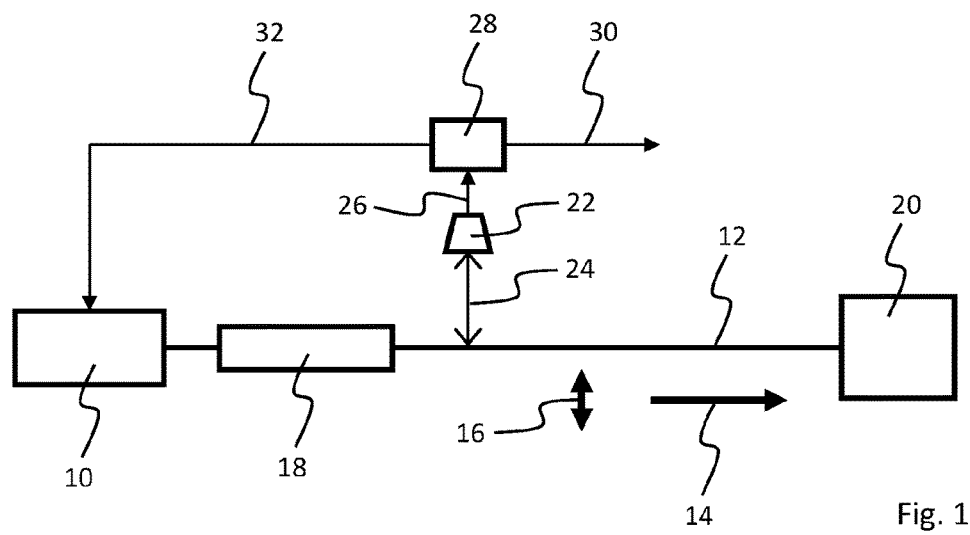
FIG. 1 schematically illustrates an embodiment of a device for detecting defects of a strand-like product.

The device according to the invention represented in FIG. 1 comprises an extrusion device 10 for extruding a strand-like product 12, in the present case a thin plastic pipe 12. The strand-like product 12 may have a small outer diameter of, for example, less than 10 mm, preferably less than 5 mm After exiting the extrusion device 10, the strand-like product 12 is conveyed in a conveying direction 14 that corresponds, at the same time, to the longitudinal axis of the strand-like product 12. The conveying speed in the conveying direction 14 may comprise, for example, more than 50 m/min, preferably more than 75 m/min During the movement of the strand-like product 12 in the conveying direction, said product can also perform a lateral movement transversely to the conveying direction, as illustrated by the arrow 16 in FIG. 1. This lateral movement has a maximum speed that is significantly less than the maximum speed in the conveying direction, for example at least 10 times less. The lateral movement illustrated by the arrow 16 may be a substantially periodic lateral oscillation. The lateral oscillation may have a comparatively low frequency of less than 10 Hz, for example less than 2 Hz, for example approximately 1 Hz.

After exiting the extrusion device 10, the strand-like product 12 generally travels through one or more cooling sections 18, in which the strand-like product 12 is cooled down for the purpose of cooling, for example by spraying on a coolant. A rolling-up device 20, in which the strand-like product 12 can be rolled up into a roll, is arranged at the end of the device represented in FIG. 1. In the example represented in FIG. 1, a transceiver 22 is arranged downstream of the cooling section 18, which transceiver comprises a transmitter for emitting terahertz radiation onto the strand-like product 12 and a receiver for receiving terahertz radiation reflected on boundary surfaces of the strand-like product 12. The terahertz radiation emitted by the transceiver 22, reflected on the strand-like product 12, and received again by the transceiver 22 is illustrated in FIG. 1 by means of the arrow 24. Measurement signals of the transceiver 22 or rather receiver are supplied to an evaluation apparatus 28 via a line 26. The evaluation apparatus 28 is structured to infer a defect of the strand-like product 12 from a temporary change in the terahertz radiation signal received by the at least one receiver. This is explained in greater detail below with reference to FIGS. 2 and 3. If the evaluation apparatus 28 detects a corresponding defect, it can for example emit a corresponding error signal, as illustrated in FIG. 1 by the arrow 30. It can also influence the extrusion device 10, as illustrated by the arrow 32, for example change production parameters of the extrusion device 10 or stop the extrusion device 10.

Figure 2:
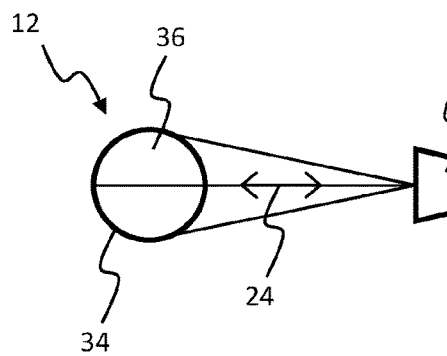
FIG. 2 schematically illustrates a part of the device shown in FIG. 1 in a first operating state.

In FIG. 2, the strand-like product 12 is represented in cross-section. Here, an internal space 36 enclosed by a cross-sectionally circular wall 34 of the strand-like product 12 in the form of a pipe can be seen. In FIG. 2, there is no defect, in particular no extrusion residue, in the internal space 36 of the strand-like product 12. The transceiver 22 or rather the receiver of the transceiver 22 accordingly receives an accordingly regular or rather uniform signal, except for a uniform signal oscillation caused by any lateral movement of the strand-like product 12. The terahertz radiation is reflected on the different boundary surfaces of the strand-like product 12, in particular on the outer face facing the transceiver 22 as well as on the inner face of the wall 34 facing the transceiver 22. Multiple reflections may also occur.

Figure 3:
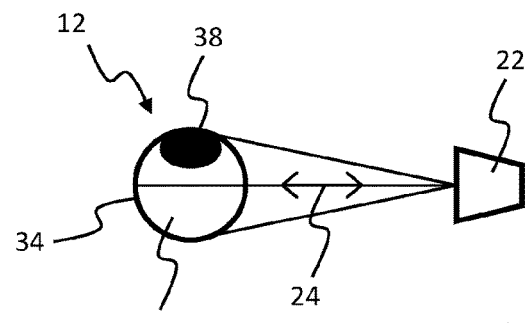
FIG. 3 schematically illustrates the embodiment of FIG. 2 in a second operating state.

FIG. 3 shows the representation from FIG. 2 in another operating state. As a result of moving the strand-like product 12 in the conveying direction, in the state represented in FIG. 3, a defect 38 remaining in the internal space 36 of the strand-like product 12 in the form of extrusion residue is in the field of view of the terahertz radiation. Due to the additional boundary surfaces as well as the change in boundary surfaces, this leads to a rapid temporary change in the received terahertz radiation signal.

Figure 5:
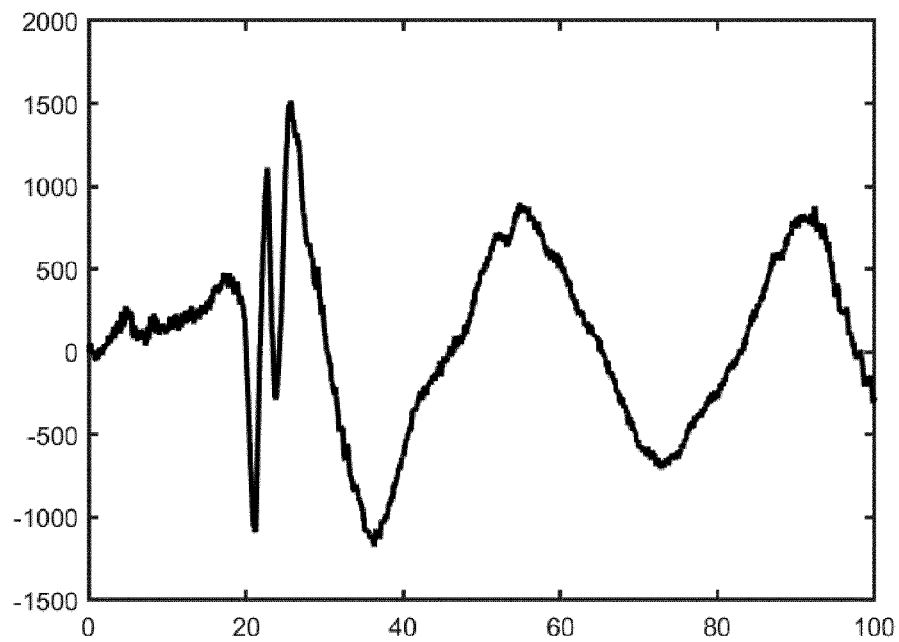
FIG. 5 shows a terahertz radiation signal received using the device of FIG. 1 and/or an embodiment of the disclosed method for detecting defects of a strand-like product.

This will be explained in more detail based on FIGS. 5 and 6. In FIG. 5, the reflected terahertz radiation signal received by the transceiver 22 is plotted as a raw signal in arbitrary units against the time in milliseconds [ms]. A rapid change in the signal with a frequency of, for example, approximately 300 Hz can be seen between about 20 ms and 25 ms. This rapid change in the signal is caused by the defect 38. As can already be seen in the raw signal of FIG. 5, said defect can be easily discriminated from a subsequent uniform oscillation of the received terahertz radiation signal, which may be caused, for example, by a lateral oscillation of the strand-like product 12. FIG. 5 also shows that, due to the lateral oscillation of the strand-like product 12, the oscillation of the terahertz signal has a much lower frequency than the change in the signal caused by the defect 38, in the present case only about 30 Hz, for example.

Figure 6:
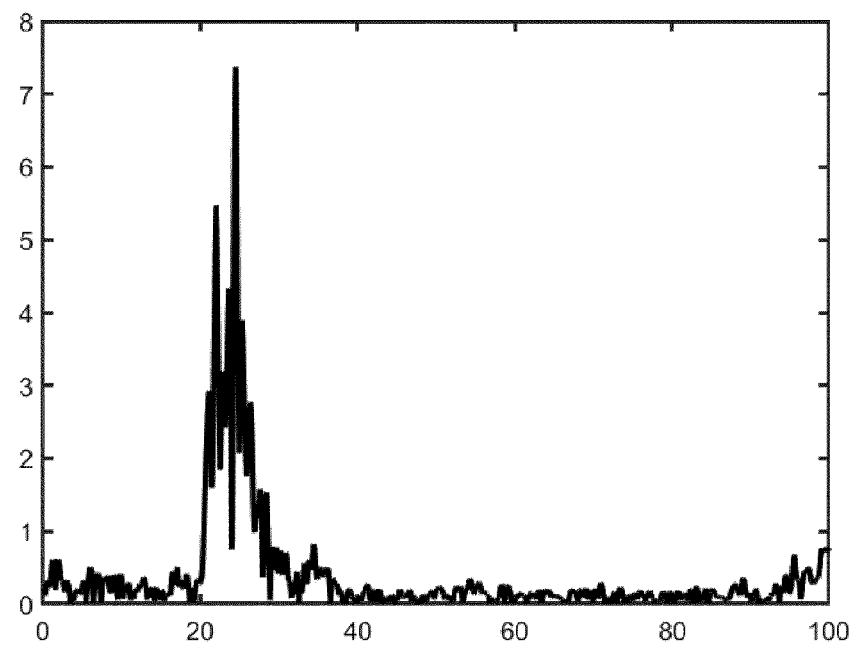
FIG. 6 illustrates an embodiment of received terahertz radiation signal from FIG. 5 in a processed state.

FIG. 6 shows a mathematically processed version of the raw signal shown in FIG. 5. Here, the received and mathematically processed terahertz radiation signal is again plotted in arbitrary units as a function of the time in milliseconds [ms]. In order to arrive at the processed signal shown in FIG. 6, squares of the second mathematical derivatives of the raw signal shown in FIG. 5, which derivatives are filtered, for example, by means of a band-pass filter, are used. In particular, if, for example, multiple transceivers are used, as is explained in greater detail below based on FIG. 4, it is possible to add up the received terahertz radiation signals of the various transceivers in order to arrive at the evaluation signal represented in FIG. 6. In FIG. 6, the defect 38, which is already fundamentally discernible in the raw signal in FIG. 5, stands out very clearly from the remaining signal curve. The oscillation of the strand-like product 12 in the lateral direction no longer has a noticeable effect. As can be seen in FIG. 6, a suitable threshold value of the mathematically processed terahertz radiation signal can be established in a simple manner for the output of a defect.

Another exemplary embodiment will be explained below with reference to FIG. 4. In the exemplary embodiment according to FIG. 4, in the example shown, three transceivers 22 are arranged so as to be distributed over the circumference of the strand-like product 12, which transceivers each emit terahertz radiation onto the strand-like product 12 and receive terahertz radiation reflected by boundary surfaces of the strand-like product 12, as illustrated again by the arrows 24. It should be noted that, in FIG. 4, only the main radiation direction in which the strongest reflections are produced is represented. It should be understood that the transceivers 22 each emit terahertz radiation which completely covers the strand-like product 12 in cross-section.

Figure 4:
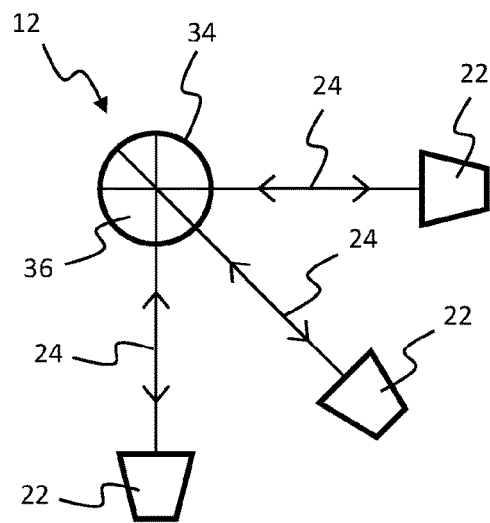
FIG. 4 schematically illustrates a part of the device shown in FIG. 1.

As already explained, the received terahertz radiation signals of the transceivers 22 in FIG. 4 can optionally be added up after mathematical processing in order to obtain the processed radiation signal shown in FIG. 6. It is also possible that the different transceivers 22 emit terahertz radiation of different frequencies, such that the received terahertz radiation can be assigned to the individual transceivers 22. In this way, it can for example be ensured that, in each case, only one receiver receives terahertz radiation from one transmitter in each case. It would also be possible, for example, for terahertz radiation from various transmitters to be received by all receivers and for said terahertz radiation to be accordingly demodulated, for example, in the case of a rigidly defined differential frequency between the transmission frequencies.

Of course, further transceivers 22 may also be arranged so as to be distributed over the circumference of the strand-like product 12, for example at regular intervals over the entire circumference. By providing multiple transceivers 22, any dependence of the detection of defects on direction can be counteracted.

LIST OF REFERENCE SIGNS

10. Extrusion device
12 Strand-like product
14 Conveying direction
16 Arrow
18 Cooling section
20 Rolling-up device
22 Transceiver
24 Arrow 26 Line
28 Evaluation apparatus
30 Arrow
32 Arrow
34 Circular wall
36 Internal space
38 Defect

The invention claimed is:

1. A method for detecting a defect of a strand-like product conveyed in a conveying direction at a conveying speed of more than 50 m/min, the method comprising:
   determining a frequency of a lateral movement of the strand-like product, wherein the lateral movement occurs on a direction that is transverse to the conveying direction;
   emitting terahertz radiation at a wavelength by at least one transmitter onto the strand-like product conveyed in the conveying direction;
   reflecting the terahertz radiation by the strand-like product;
   receiving the reflected terahertz radiation by at least one receiver;
   detecting a temporary change in the terahertz (THz) radiation received by the at least one receiver; and
   inferring a defect in the strand-like product when a frequency of the temporary change in the terahertz radiation received by the at least one receiver is higher than the frequency of the lateral movement of the strand-like product.

2. The method according to claim 1, wherein the strand-like product comprises a pipe extruded in an extrusion device, and wherein the defect comprises extrusion residue inside the pipe.

3. The method according to claim 1, further comprising conveying the strand-like product at a conveying speed of more than 75 m/min in the conveying direction.

4. The method according to claim 1, further comprising forming a wall thicknesses of the strand-like product that is smaller than a wavelength of the THz radiation used.

5. The method according to claim 1, further comprising:
   forming a first derivative of the terahertz radiation received by the at least one receiver; and
   inferring the defect when the derived terahertz radiation exceeds a defined threshold value.

6. The method according to claim 5, further comprising forming a n-th derivative of the terahertz radiation received by the at least one receiver, wherein n≥2, and inferring the defect when the n-fold derived terahertz radiation exceeds a defined threshold value.

7. The method according to claim 5, further comprising defining the threshold value based on the conveying speed of the strand-like product in the conveying direction.

8. The method according to claim 1, further comprising filtering the terahertz radiation received by the at least one receiver using a band-pass filter.

9. The method according to claim 1, further comprising emitting a terahertz signal by the least one transmitter, wherein the terahertz signal comprises a bandwidth that is less than a frequency that corresponds to a spatial resolvability of a diameter of the strand-like product.

10. The method according to claim 1, wherein the at least one transmitter emits a terahertz signal with a bandwidth of less than 5% of an average frequency of the terahertz signal.

11. The method according to claim 1, further comprising structuring the at least one transmitter to emit a terahertz continuous wave signal at a frequency with a substantially constant amplitude.

12. The method according to claim 1, further comprising configuring multiple transmitters to emit the terahertz radiation from different directions onto the strand-like product conveyed in the conveying direction, and configuring multiple receivers to receive the terahertz radiation reflected by the strand-like product.

13. The method according to claim 12, further comprising configuring characterized the multiple transmitters to emit terahertz radiation of different frequencies.

14. The method according to claim 13, further comprising configuring the multiple receivers to evaluate the received terahertz radiation using demodulation of the different frequencies of the emitted terahertz radiation.

15. The method according to claim 11, further comprising summing squares of the received radiation signals before the defect is inferred.

16. The method according to claim 1, further comprising focusing the terahertz radiation emitted by the at least one transmitter such that a region of the strand-like product irradiated by the terahertz radiation in the conveying direction is smaller than in a direction transverse to the conveying direction.

17. The method according to claim 1, further comprising orienting at least one of (i) the at least one transmitter and (ii) the at least one receiver with respect to the strand-like product such that a main beam direction of the terahertz radiation extends obliquely to the conveying direction of the strand-like product.

18. A device for detecting a defect of a strand-like product conveyed in a conveying direction at a conveying speed of more than 50 m/min, wherein the strand-like product performs a lateral movement transversely to the conveying direction when being conveyed in the conveying direction, the device comprising:
   at least one transmitter configured to emit terahertz radiation onto the strand-like product conveyed in the conveying direction;
   at least one receiver configured to receive terahertz radiation reflected by the strand-like product; and
   an evaluation apparatus configured to infer the defect of the strand-like product from a temporary change in a frequency of the terahertz radiation received by the at least one receiver that is higher than a frequency of the lateral movement of the strand-like product.

19. The device according to claim 18, further comprising an extrusion device, wherein the strand-like product comprises a pipe extruded in the extrusion device, and wherein that the defect to be detected comprises extrusion residue inside the pipe.

20. The device according to claim 18, further comprising:
   multiple transmitters configured to emit terahertz radiation from different directions onto the strand-like product conveyed in the conveying direction, and
   multiple receivers configured to receive the terahertz radiation emitted by the multiple transmitters and reflected by the strand-like product.

* * * * *